US006283519B1

(12) United States Patent
Dutton et al.

(10) Patent No.: US 6,283,519 B1
(45) Date of Patent: Sep. 4, 2001

(54) LIGHTING ROD AND METHOD

(76) Inventors: Calvin E. Dutton, 13434 Myrna La., Houston, TX (US) 77015; Oneal Bacon, 8335 Rinn, Houston, TX (US) 77078

( * ) Notice: Subject to any disclaimer, the term of this patent is extended or adjusted under 35 U.S.C. 154(b) by 0 days.

(21) Appl. No.: 09/118,469

(22) Filed: Jul. 17, 1998

(51) Int. Cl.[7] ................................ B25J 1/00; A47F 13/06
(52) U.S. Cl. ............................................ 294/19.1; 294/26
(58) Field of Search ................................ 294/19.1, 19.3, 294/22–24, 26; 81/53.1, 487, 488

(56) References Cited

U.S. PATENT DOCUMENTS

| | | | | |
|---|---|---|---|---|
| 1,724,435 | * | 8/1929 | Studwell | 294/19.1 |
| 2,542,665 | * | 2/1951 | Gustafson | 294/26 |
| 3,101,964 | * | 8/1963 | Reaser | 294/26 |
| 3,311,398 | * | 3/1967 | Erhardt | 294/19.1 |
| 3,863,377 | * | 2/1975 | Leonard | 294/19.3 |
| 4,242,930 | * | 1/1981 | Myers et al. | 294/19.1 |
| 5,553,905 | * | 9/1996 | Bentivegna | 294/19.1 |
| 5,560,975 | | 10/1996 | Casper | 428/99 |
| 5,713,617 | | 2/1998 | Marinaro | 294/24 |
| 5,964,489 | * | 10/1999 | Mahoney | 294/19.1 |

* cited by examiner

*Primary Examiner*—Dean J. Kramer
(74) *Attorney, Agent, or Firm*—Derek R. Van Gilder

(57) ABSTRACT

A lighting rod has a reach rod (1) that is preferably non-conductive and has a holder hook (4) on a hook end and a hook releaser (9, 10) on a handle end. The holder hook spring-grasps cords (15, 29) or lines against a rod tip (2) by spring pressure of a hook spring (8, 11) on or in the reach rod. The hook releaser has a release member that contacts a hook base (7, 12) for releasing spring pressure on the holder hook. At least one channel (23, 24) in the rod tip receives an open end of the holder hook to allow tight retainment of a cord, line or other item positioned in the holder hook. An attachment-hook groove in the rod tip can be provided to receive a hook portion of an attachment hook for containing the attachment hook rigidly while a threaded portion (28) of the attachment hook is being screwed into material by rotation of the reach rod for screwing attachment hooks into and out of the material. The holder hook and the rod tip can be structured to contain a wide selection of items.

21 Claims, 3 Drawing Sheets

FIG. 8
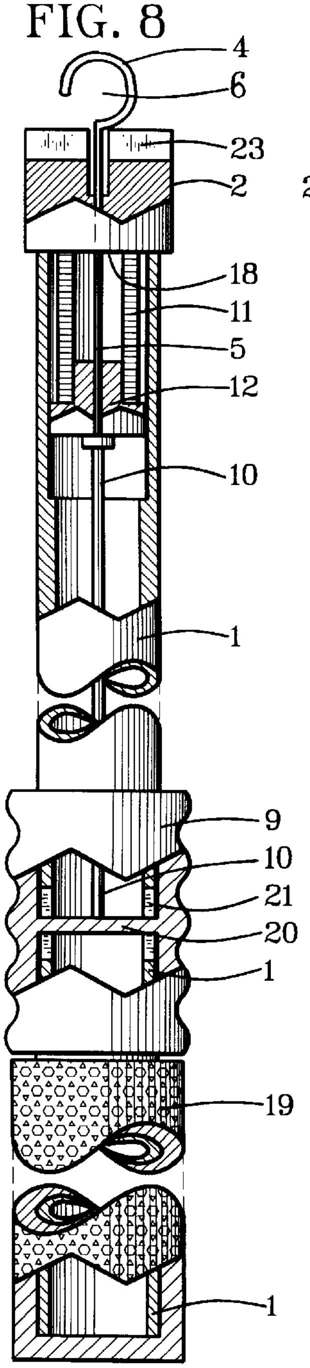
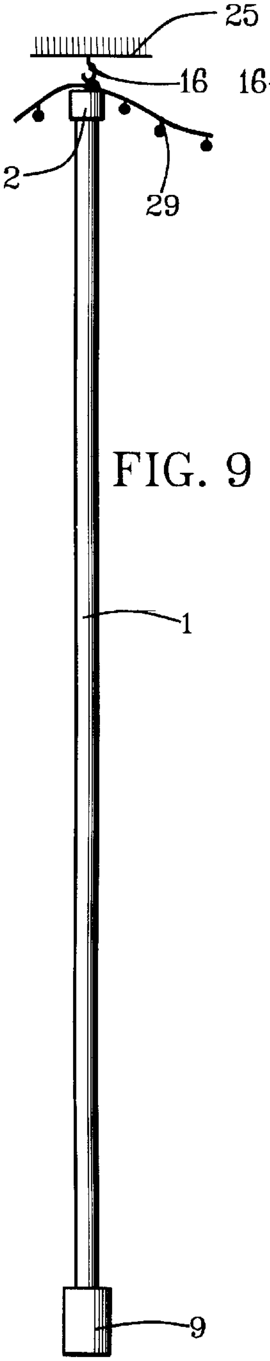
FIG. 9
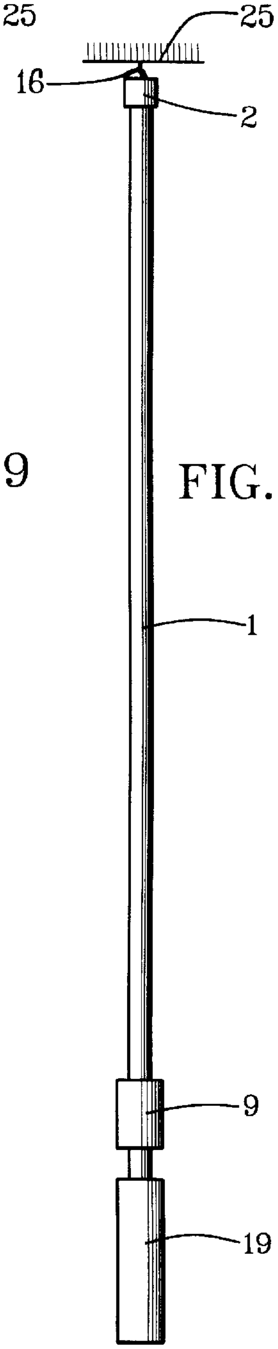
FIG. 10
FIG. 11
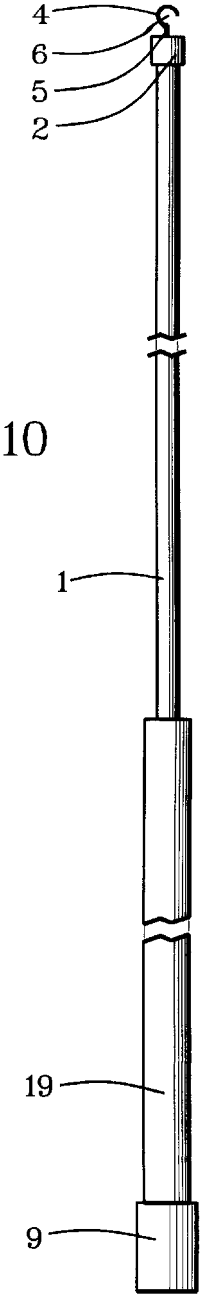

LIGHTING ROD AND METHOD

BACKGROUND OF THE INVENTION

1. Field of the Invention

This invention relates to hangers and un-hangers of Christmas lights on hooks attached to eaves of houses and positioning other items in and out of hard-to-reach places.

2. Relation to Prior Art

Hanging Christmas lights usually requires a ladder to be moved from-hook-to-hook about a house and other structures such as a nearby garage and poles. Previously, hook hangers have been devised to aid in hanging Christmas lights, but not with the ease, convenience and reliability of a spring-tensioned hook on a non-conductive handle in a manner taught by this invention.

Examples of different but related lighting rods are described in the following patent documents. U.S. Pat. No. 5,713,617, issued to Marinaro, described a combination window washer and lighting rod without the convenience of spring-held grasping and controllable releasing of cord taught by this invention. U.S. Pat. No. 5,560,975, issued to Casper, described a decorating system for positioning Christmas tree light cords on limb hooks with an aperture into which a hook-holder with a handle was positioned.

Problems with hanging and unchanging Christmas lights and other items such as lines on hooks on buildings and other structures continue to exist, however.

SUMMARY OF THE INVENTION

In light of these problems, objects of patentable novelty and utility taught by this invention are to provide a lighting rod which:

- Spring-grasps a cord, line or other item on a distal end of a pole while a proximal end having a handle is being held to position the cord, line or other item where desired;
- Releases cord or other item by actuation of the handle on the proximal end;
- Spring-grasps cords, lines or other items on hooks or in places that are too high or distantly positioned to reach without a ladder;
- Grasps threaded hooks snugly while being screwed into or out from wood, sheet metal of plastic material in desired hooking positions such as eaves of houses or other structures that are too high or distantly positioned to reach without a ladder or other extension means;
- Prevents conduction of electrical current to a user by non-conductivity of the pole;
- Holds tools for long-reach access;
- Holds and/or positions other items such as window washers, basketball hoops, volleyball-net lines, tent lines, vehicle-load tie-down lines, fishing lines, clothes lines, mooring lines, and various decorative lines;
- Picks fruit and nuts from trees; and
- Grasps saprophyte growths and other items from trees and other distant places.

This invention accomplishes these and other objectives with a lighting rod having a rigid reach rod that is preferably a nonconductive tube such as PVC and has a holder hook on a hook end and a hook releaser on a handle end. The holder hook spring-grasps cords, lines and pairs of items against a rod tip by contractive spring pressure of a hook spring on or in the rod. The hook releaser has a release rod that is actuated against a base of the holder hook to release springclosure pressure on the holder hook. A groove in the rod tip receives an open end of the holder hook to allow tight retainment of a cord, line or other items positioned in the holder hook. An attachment-hook groove in the rod tip can be provided to receive a hook portion of an attachment hook for containing the attachment hook rigidly while a threaded shank of the attachment hook is being screwed into material by rotation of the rod for screwing attachment hooks into and out of the material.

BRIEF DESCRIPTION OF DRAWINGS

This invention is described by appended claims in relation to description of a preferred embodiment with reference to the following drawings which are described briefly as follows:

FIG. 8 is a partially cutaway side view of a lighting rod having a screw-in handle on a handle end and having a spring-release handle inwardly from a handle end;

FIG. 9 is an elevation view of a lighting rod being used to hang Christmas lights on an attachment hook extended downwardly from eaves of a structure;

FIG. 10 is an elevation view of a lighting rod being used to rotate an attachment hook into a structure; and FIG. 11 is a partially cutaway elevation view of a lighting rod with a telescopic reach rod.

DESCRIPTION OF PREFERRED EMBODIMENT

Terms used to describe features of this invention are listed below with numbering in the order of their initial use with reference to the drawings. These terms and numbers assigned to them designate the same features wherever used throughout this description.

| | |
|---|---|
| 1. Reach rod | 16. Attachment hook |
| 2. Rod tip | 17. Contraction-spring base |
| 3. Hook aperture | 18. Expansion-spring base |
| 4. Holder hook | 19. Rod handle |
| 5. Holder-hook shank | 20. Release-sleeve member |
| 6. Hook bay | 21. Release slot |
| 7. Contraction-spring hook base | 22. Central extension |
| 8. Contraction spring | 23. Holder-hook channel |
| 9. Spring-release handle | 24. Attachment-hook channel |
| 10. Spring-release member | 25. Eaves |
| 11. Expansion spring | 26. Positioning washer |
| 12. Expansion-spring hook base | 27. Central step |

-continued

| | |
|---|---|
| 13. Contraction coils | 28. Threaded shank |
| 14. Expansion coils | 29. Christmas light cord |
| 15. Line | |

Figure 1:
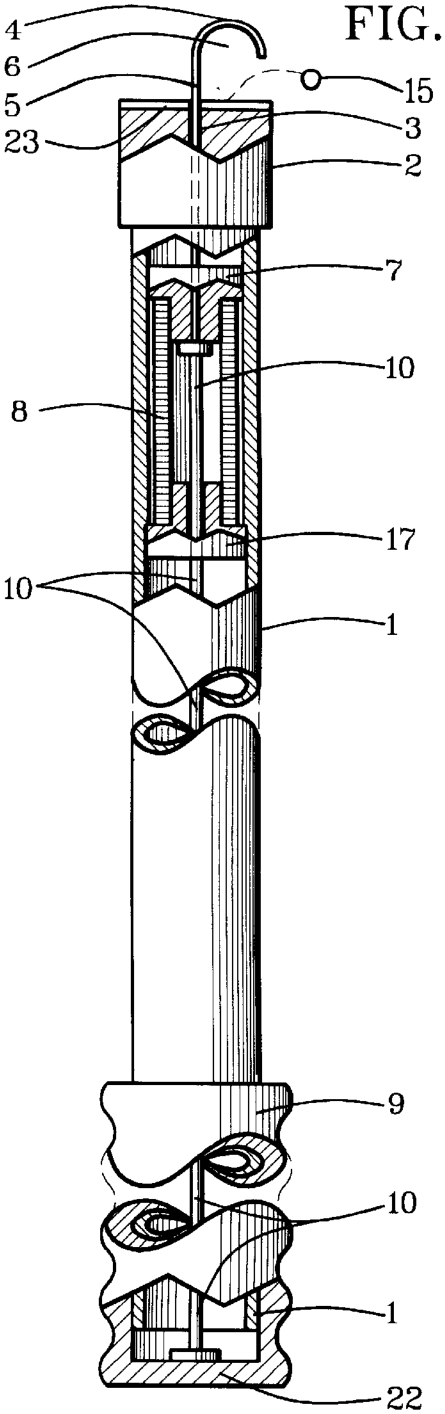
FIG. 1 is a lighting rod with a contraction-spring hook and having a holder hook in open mode for receiving a line such as a Christmas-light cord or other item.
Figure 2:
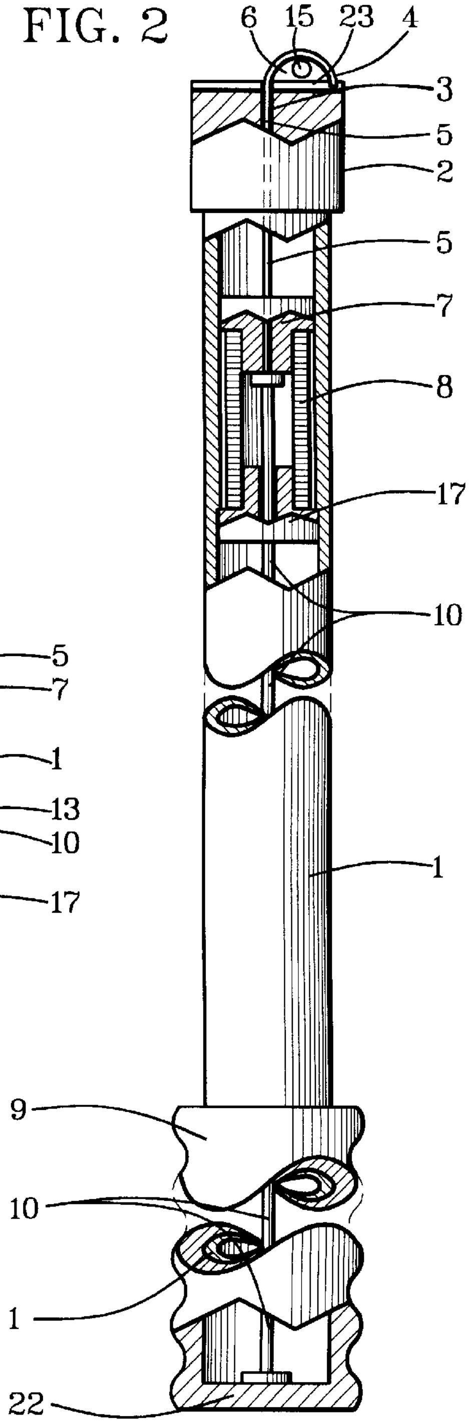
FIG. 2 is the FIG. 1 illustration with a holder hook in closed mode on a line.

Referring first to FIGS. 1–2, a lighting rod has a reach rod 1 that is preferably an electrically nonconductive rigid tube such as PVC tubing or bar stock having a handle end and a hook end. A rod tip 2 is affixed to the hook end and has a hook aperture 3 that is sized, shaped and positioned to receive a shank of a holder hook 4 loosely. The holder hook 4 has a holder-hook shank 5 positioned in the hook aperture 3, a hook bay 6 on a hook side of the rod tip 2 and a hook base such as a contraction-spring hook base 7 to which the holder-hook shank 5 is attached on a handle side of the rod tip 2.

A hook spring such as a contraction spring 8 has spring-pressure actuation of a hook base such as the contraction-spring hook base 7 in a direction that is towards the handle end of the reach rod 1 and away from the hook end of the reach rod 1. A spring releaser has a spring-release handle 9 proximate a handle end of the reach rod 1 and a spring-release member 10 such as a rigid rod, bar or tube positioned intermediate the spring-release handle 9 and the hook base such as the contraction-spring hook base 7.

Figure 3:
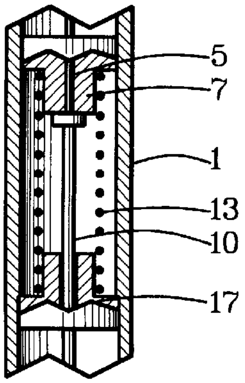
FIG. 3 is a partially cutaway side view of a spring portion of a lighting rod having a coil spring.

Referring to FIGS. 1–7, the hook spring can be either a contraction spring 8 as shown in FIGS. 1–3 or an expansion spring 11 as shown in FIGS. 4–5 and 7–8 to provide spring pressure in a single direction towards the handle end of the reach rod 1 by select spring-end positioning of a hook base. Commonality for use of either contraction or expansion springs is provided by positioning a contraction-spring hook base 7 at a hook end of the contraction spring 8 as depicted in FIGS. 1–3 and conversely by positioning an expansion-spring hook base 12 at a handle end of the expansion spring 11 as depicted in FIGS. 4–5 and 7–8. Operation, use, external appearance and all but hook-base positioning are the same for the different types of springs.

Figure 4:
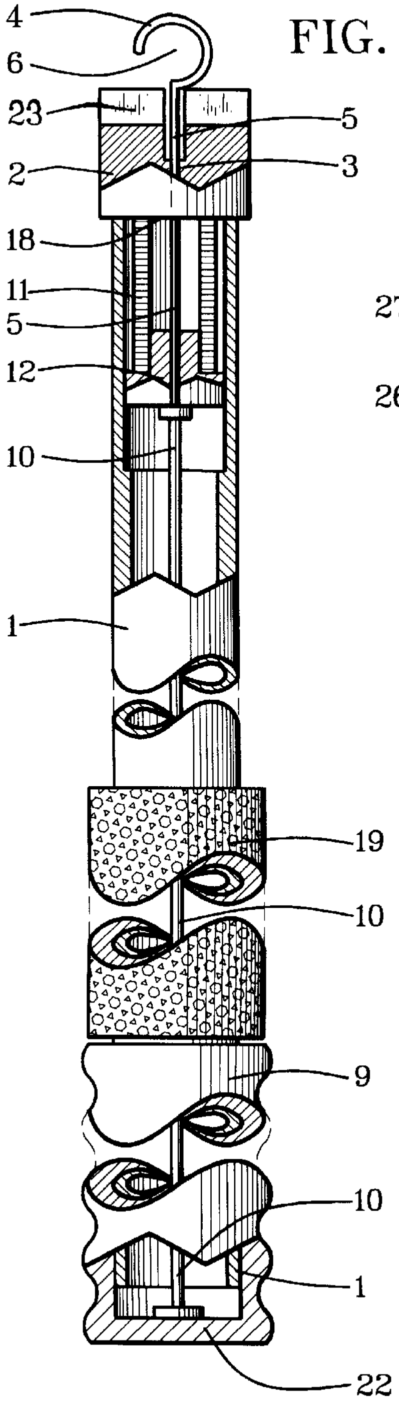
FIG. 4 is a partially cutaway elevation view of a lighting rod having an expansion spring that is rubberlike.
Figure 7:
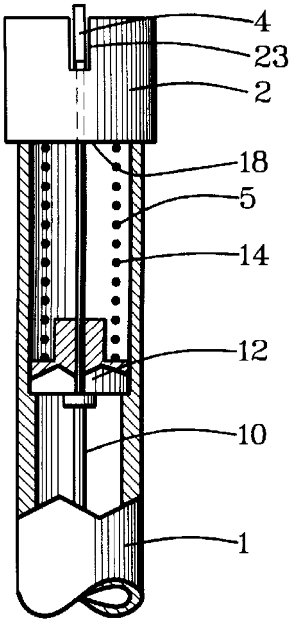
FIG. 7 is a partially cutaway side view of a spring portion of a lighting rod having a coil expansion spring.

Additionally, the contraction springs 8 can be rubberlike as represented in FIGS. 1–2 or have contraction coils 13 as depicted in FIG. 3. The expansion springs 11 also can be rubberlike as represented in FIGS. 4–5 and 8 or have expansion coils 14 as depicted in FIG. 7.

For opening the holder hook 4 in opposition to the contraction spring 8 or the expansion spring 11, a hook end of the spring-release member 10 is forced against the contraction-spring hook base 7 or the expansion-spring hook base 12 respectively by manually forcing the spring-release handle 9, to which the spring-release member 10 is connected, in a tip-ward direction towards the rod tip 2. Conversely, for allowing the holder hook 4 to close onto line 15, onto an attachment hook 16 or onto other objects, tip-ward pressure on the spring-release handle 9 is released.

Figure 5:
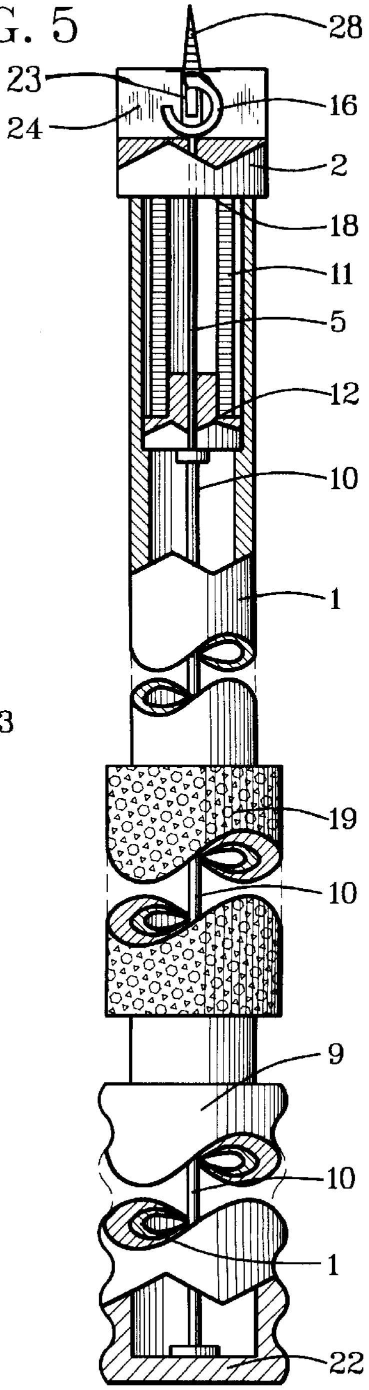
FIG. 5 is a partially cutaway elevation view of a lighting rod having an expansion spring in open mode and containing an attachment hook to be screwed into or unscrewed from a structure for hanging cord.

The most common attachment hook 16 for hanging Christmas lights and other items with this lighting rod is a form of C-hook with a threaded shank as shown in FIG. 5. It is referred to commonly also as a cup hook.

There is a contraction-spring base 17 at a handle end of the contraction spring 8, as shown in FIGS. 1–3, and an expansion-spring base 18 at a hook end of the expansion spring 11, as shown in FIGS. 4–5 and 7–8. Due to separation pressure of the contraction spring 8 from the contraction-spring hook base 7 and the contraction-spring base 17, reliable attachment of the contraction spring 8 thereto is essential. Oppositely for the expansion spring 11, mere positioning of the expansion spring 11 firmly between the expansion-spring hook base 12 and an expansion-spring base 18 such as a handle-side surface of the rod tip 2 is adequate.

As depicted in FIGS. 1–3, actuating contact of the contraction-spring hook base 7 with the spring-release member 10 to open the holder hook 4 requires traverse of the contraction-spring base 17 and a suitable opening or aperture in the contraction spring 8. Contact of the spring-release member 10 with the expansion-spring hook base 12, however is direct as depicted in FIGS. 4–5 and 7–8.

In addition to the spring-release handle 9 on the handle end of the reach rod 1, a rod handle 19 can be positioned either intermediate the spring-release handle 9 and the rod tip 2 as shown in FIGS. 4–5 or at a handle end of the spring-release handle 9 as shown in FIGS. 8 and 10. Positioned on a tip-ward side of the spring-release handle 9 as shown in FIG. 11, the rod handle 19 can be also a telescopic receptacle for the reach rod 1. For handle-end positioning of the spring-release handle 9, the spring-release member 10 is attached centrally to a central extension 22 from the handle end of the spring-release handle 9 as shown in FIGS. 1–2 and 4–5. For tip-ward positioning of the spring-release handle 9, the spring-release member 10 is attached to the spring-release handle 9 with at least one release-sleeve member 20 that is extended laterally into the reach rod 1 through at least one release slot 21 in the reach rod 1.

The spring-release handle 9 is preferably corrugated or serrated circumferentially for linear actuation as indicated in FIGS. 1–2, 4–5 and 8. The rod handle 19, however, is preferably non-skid surfaced as indicated in FIGS. 4–5 and 8 for rotational actuation and for multi-directional actuation resistance.

Referring to FIGS. 1–2, and 4–11, the rod tip 2 is structured for crewing hooks in or out of a structure or for holding objects in addition to hanging and un-hanging line and cords. A holder-hook indentation such as a holder-hook channel 23 can be provided for reliable hooking or grasping of objects such as cord or line 15 in the hook bay 6. An attachment-hook channel 24 that is preferably orthogonal to the holder-hook channel 23 can be provided to contain hook portions of attachment hooks 16 while the attachment hooks 16 are being screwed into or out of eaves 25 or other structure indicated by a horizontal line in FIGS. 9–10.

A holder hook 4 used for screwing attachment hooks 16 in or out of a structure preferably has a centered hook bay 6 as shown in FIG. 8 for positioning the attachment hooks 16 centrally in order to rotate their threaded shanks concentrically. Most attachment hooks 16 also have centered bays with threaded shanks positioned centrally. The holder-hook channels 23 and the attachment-hook channels 24 can be used interchangeably for most attachment hooks 16 because their widths and bay sizes are not sufficiently different from holder hooks 4. However, some attachment hooks 16 are considerably wider and have considerably bigger bays than the holder hooks 4. For this reason and to be able to hold a selection of other objects such as window washers, cups, mugs, utensils, rods, fibrous materials and a wide variety of lines, it is preferable but not essential that the attachment-hook channel 24 or one of the channels be larger and deeper than the holder-hook channel 23. A widest or largest object or hook can be positioned in a wide and deep channel and a smaller object positioned in a smaller one if there are two sizes of channels 23 and 24.

Figure 6:
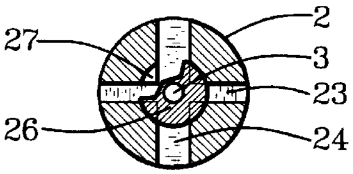
FIG. 6 is a top view of a rod tip having a positioning washer for holding an attachment screw straight while being screwed into a structure.

To aid concentric positioning of a threaded shaft of an attachment hook 16 for accurate rotation, a positioning washer 26 can be positioned in a central step 27 as shown in FIG. 6. The positioning washer can be placed first on a threaded shank 28 of a C-hook such as the attachment hook 16 or other type of hook. Some C-hooks are produced with positioning washers on them but are not necessarily sized for central steps 27 on lighting rods. Positioning washers 26 can be provided with the lighting rods for this use.

For hanging cord or positioning other items, the lighting rod is used by placing an item such as a Christmas light cord 29 in the holder hook 4, maneuvering the lighting rod to place the item where desired or to use the item as desired while in the holder hook 4 and then removing the item from the holder hook 4. The rod tip 2 and the channels 23 and 24 can be structured for a wide selection of grasping objectives. The holder hook 4 in combination with the rod tip 2 on a reach rod 1 is similar to the human thumb and hand on a long arm.

Items or parts of items are grasped by first releasing tension of the contraction spring 8 or the expansion spring 11 which is used in a particular lighting rod and then placing an item or part of an item in the holder hook 4. Tension of a spring 8 or 11 is then allowed to close the holder hook 4 onto the item. Items are removed from the holder hook 4 similarly by releasing tension of the spring 8 or 11 and taking the item out of the holder hook 4. Tension of the spring 8 or 11 is released by sliding the spring-release handle 9 tip-ward from the handle end of the reach rod 1. Tension of the spring 8 or 11 is allowed to tighten the holder hook 4 onto an item by allowing the spring-release handle 9 to travel back towards the handle end of the reach rod 1.

Optionally to the tubular reach rod 1, it is foreseeable within this invention and intended that non-tubular bars or rods instead of tubes be used for its construction with an outside spring 8 or 11, an outside spring-release member 10 and corresponding outside components related thereto. It is foreseeable also that electrically conductive materials can be used for some but not all construction of the reach rod 1. Particular structure and nonconductive features of the components of this invention have been described for plurality of applications, not for exclusion of substitutional equivalents of structure and conductive features.

A new and useful lighting rod having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A lighting rod comprising:

a reach rod which is a rigid member having a handle end and a hook end;

a rod tip affixed to the hook end of the reach rod and having a hook aperture that is sized, shaped and positioned to receive a shank of a holder hook loosely;

a holder hook having a holder-hook shank positioned in the hook aperture, a hook bay on a hook side of the rod tip and a hook base to which the holder-hook shank is attached on a handle side of the rod tip;

a hook spring having spring-pressure actuation of the hook base in a direction that is towards the handle end of the reach rod and away from the hook end of the reach rod;

a spring releaser having a spring-release handle proximate a handle end of the reach rod and a spring-release member intermediate the spring-release handle and the hook base;

the hook spring being a contraction spring that has contraction pressure intermediate a contraction-spring hook base and a contraction-spring base; and the contraction spring having a hook end attached to the contraction-spring hook base and a handle end attached to the contraction-spring base.

2. A lighting rod as described in claim 1 wherein:

the reach rod is an electrically nonconductive rigid tube.

3. A lighting rod as described in claim 1 wherein:

the contraction spring is a rubberlike member.

4. A lighting rod as described in claim 3 wherein:

the rubberlike member is tubular.

5. A lighting rod as described in claim 1 wherein:

the contraction spring has spring coils.

6. A lighting rod as described in claim 1 wherein:

the spring-release member is a spring-release rod having a rod end attached to a release-handle sleeve having an inside periphery that slides on an outside periphery of the handle end of the reach rod; and the spring-release rod is extended to a position of actuating contact with the contraction-spring hook base.

7. A lighting rod as described in claim 1 wherein:

the rod tip has at least one hook channel into which a curved end of the holder hook is positioned by tip-end travel of the holder hook.

8. A lighting rod as described in claim 1 wherein:

the rod tip has an attachment-hook channel that is sized, shaped and positioned to receive an attachment hook;

the holder-hook shank of the holder hook is extended from a center of the hook bay of the holder hook.

9. A lighting rod as described in claim 8 and further comprising:

a rod handle proximate a handle end of the reach rod for grasping the reach rod to rotate an attachment hook in the attachment-hook channel in order to screw the attachment hook into material proximate a hook end of the reach rod.

10. A lighting rod as described in claim 9 wherein:

the rod handle is positioned intermediate the spring-release handle and the rod tip; and the spring-release member is attached centrally to a central extension from a handle end of the spring-release handle.

11. A lighting rod as described in claim 9 wherein:

the rod handle is positioned on a handle end of the reach rod;

the spring-release handle is positioned intermediate the rod handle and the hook spring; and the spring-release member is attached to the spring-release handle with at least one release-sleeve member extended laterally into the reach rod through at least one release slot in the reach rod.

12. A lighting rod as described in claim 9 wherein:

the rod tip has a receptacle bay that is sized, shaped and positioned to receive generally rod-like objects and fibrous materials for retainment in the receptacle bay by the holder hook.

13. A lighting rod as described in claim 12 wherein:

the receptacle bay is an attachment-hook channel that is sized and shaped to contain desired items or parts of items.

14. A lighting rod comprising:

a reach rod which is a rigid member having a handle end and a hook end;

a rod tip affixed to the hook end of the reach rod and having a hook aperture that is sized, shaped and positioned to receive a shank of a holder hook loosely;

a holder hook having a holder-hook shank positioned in the hook aperture, a hook bay on a hook side of the rod tip and a hook base to which the holder-hook shank is attached on a handle side of the rod tip;

a hook spring having spring-pressure actuation of the hook base in a direction that is towards the handle end of the reach rod and away from the hook end of the reach rod;

a spring releaser having a spring-release handle proximate a handle end of the reach rod and a spring-release member intermediate the spring-release handle and the hook base;

the hook spring is an expansion spring that has expansion pressure intermediate an expansion-spring hook base and an expansion-spring base;

the expansion spring has a hook end attached to the expansion-spring hook base and a handle end buttressed against an expansion-spring base;

the expansion-spring base is on a handle side of the rod tip; and the expansion spring is a rubberlike member.

15. A lighting rod comprising:

a reach rod which is a rigid member having a handle end and a hook end;

a rod tip affixed to the hook end of the reach rod and having a hook aperture that is sized, shaped and positioned to receive a shank of a holder hook loosely;

a holder hook having a holder-hook shank positioned in the hook aperture, a hook bay on a hook side of the rod tip and a hook base to which the holder-hook shank is attached on a handle side of the rod tip;

a hook spring having spring-pressure actuation of the hook base in a direction that is towards the handle end of the reach rod and away from the hook end of the reach rod;

a spring releaser having a spring-release handle proximate a handle end of the reach rod and a spring-release member intermediate the spring-release handle and the hook base;

the hook spring is an expansion spring that has expansion pressure intermediate an expansion-spring hook base and an expansion-spring base;

the expansion spring has a hook end attached to the expansion-spring hook base and a handle end buttressed against an expansion-spring base;

the spring-release member is a spring-release rod having a rod end attached to a spring-release handle having an inside periphery that slides on an outside periphery of the handle end of the reach rod; and the spring-release rod is extended to a position of actuating contact with the expansion-spring base.

16. A method comprising the following steps for using a lighting rod:

providing a lighting rod having a reach rod that is electrically nonconductive and rigid with a handle end and a hook end; a rod tip affixed to the hook end of the reach rod and having a hook aperture that is sized, shaped and positioned to receive a shank of a holder hook loosely; a holder hook having a holder-hook shank positioned in the hook aperture, a hook bay on a hook side of the rod tip and a hook base to which the holder-hook shank is attached on a handle side of the rod tip; a hook spring having resilient spring pressure that is contractional in a direction that is towards the handle end of the reach rod and away from the hook end of the reach rod; a spring releaser having a spring-release handle proximate a handle end of the reach rod and a spring-release member intermediate the spring-release handle and the hook base; and the spring-release member being a spring-release rod having a hook end proximate a spring base and having a handle end attached to the spring-release handle with an inside periphery that slides on an outside periphery of the handle end of the reach rod;

forcing the spring-release handle in a direction towards the rod tip in order to open the holder hook by actuation of the spring-release member against the hook base;

positioning at least one item or part of an item in the holder hook;

allowing the holder hook to close onto the item or portion of the item which then becomes a holder-hooked item by ceasing to force the spring-release handle towards the rod tip;

maneuvering the reach rod and the holder hook to place the holder-hooked item in a desired position for retainment of the holder-hooked item which then becomes a positioned item;

forcing the spring-release handle in a direction towards the rod tip in order to open the holder hook by actuation of the spring-release member against the hook base; and removing the holder hook from the positioned item.

17. A method as described in claim 16 and comprising the additional steps of:

placing at least a portion of the positioned item in the holder hook after forcing the spring-release handle in a direction towards the rod top in order to open the holder hook by actuation of the spring-release member against the hook base;

allowing the holder hook to close onto the positioned item which then becomes the holder-hooked item in the holder hook by ceasing to force the spring-release handle towards the rod tip;

removing the holder-hooked item from a former position with the lighting rod;

forcing the spring-release handle in a direction towards the rod tip in order to open the holder hook by actuation of the spring-release member against the hook base; and removing the holder hook from the portion of the item.

18. A method comprising the following steps for using a lighting rod:

providing a lighting rod having a reach rod that is electrically nonconductive and rigid with a handle end and a hook end; a rod tip affixed to the hook end of the reach rod and having a hook aperture that is sized, shaped and positioned to receive a shank of a holder hook loosely; a holder hook having a holder-hook shank positioned in the hook aperture, a hook bay on a hook side of the rod tip and a hook base to which the holder-hook shank is attached on a handle side of the rod tip; a hook spring having resilient spring pressure that is contractional in a direction that is towards the handle end of the reach rod and away from the hook end of the reach rod; a spring releaser having a spring-release handle proximate a handle end of the reach rod and a spring-release member intermediate the spring-release handle and the hook base; and the spring-release member being a spring-release rod having a hook end proximate a spring base and having a handle end attached to the spring-release handle with an inside periphery that slides on an outside periphery of the handle end of the reach rod;

providing a rod tip having an attachment-hook channel and a holder-hook channel that intersect at the hook aperture;

providing a holder-hook shank of the holder hook that is extended from a center of the hook bay of the holder hook;

forcing the spring-release handle in a direction towards the rod tip in order to open the holder hook by actuation of the spring-release member against the hook base;

providing an attachment hook having an arcuate-bay portion and a threaded shank;

positioning the holder hook in the arcuate-bay portion of the attachment hook;

allowing the holder hook to close onto the arcuate-bay portion of the attachment hook by ceasing progressively to force the spring-release handle towards the rod tip while progressively positioning the arcuate-bay portion of the attachment hook in the attachment-hook channel;

rotating the reach rod in a desired direction of rotation;

forcing the spring-release handle in a direction towards the rod tip in order to open the holder hook by actuation of the spring-release member against the spring base;

removing the attachment hook from the attachment-hook channel; and removing the holder hook from the attachment hook.

19. A method as described in claim 18 wherein:

the desired direction of rotation of the reach rod is a screw-in direction of rotation; and maneuvering the reach rod to pressure a tip of the threaded shank against position material in order to screw the threaded shank of the attachment hook into the position material of a desired structure.

20. A method as described in claim 18 wherein:

the desired direction of rotation of the reach rod is a screw-out direction of rotation in order to unscrew the threaded portion of the attachment hook from the position material.

21. A method as described in claim 18 wherein:

the rod tip has a washer step centrally on a hook side of the rod tip at an intersection of the attachment-hook channel and the holder-hook channel;

providing a positioning washer having a centered positioning orifice for receiving a threaded shank and having an outside periphery that fits into the washer step; and positioning the positioning washer on the threaded shank of the attachment hook and positioning the positioning washer in the washer step prior to rotating the reach rod in the desired direction.

* * * * *